United States Patent
Leitgeb et al.

(10) Patent No.: US 12,313,402 B2
(45) Date of Patent: May 27, 2025

(54) METHOD FOR COMPENSATING THE ARTIFACTS GENERATED BY MOVING MEASUREMENT OBJECTS IN MEASUREMENT SIGNALS OF SWEPT-SOURCE OCT SYSTEMS

(71) Applicant: Carl Zeiss Meditec AG, Jena (DE)

(72) Inventors: Rainer Leitgeb, Vienna (AT); Michael Niederleithner, Vienna (AT)

(73) Assignee: Carl Zeiss Meditec LLP, Jena (DE)

( * ) Notice: Subject to any disclaimer, the term of this patent is extended or adjusted under 35 U.S.C. 154(b) by 1027 days.

(21) Appl. No.: 17/282,641

(22) PCT Filed: Oct. 1, 2019

(86) PCT No.: PCT/EP2019/076592
§ 371 (c)(1),
(2) Date: Sep. 8, 2021

(87) PCT Pub. No.: WO2020/070127
PCT Pub. Date: Apr. 9, 2020

(65) Prior Publication Data
US 2021/0404791 A1 Dec. 30, 2021

(30) Foreign Application Priority Data

Oct. 2, 2018 (DE) ..................... 10 2018 007 757.9

(51) Int. Cl.
*G01B 9/02055* (2022.01)
*G01B 9/02004* (2022.01)
(Continued)

(52) U.S. Cl.
CPC ..... *G01B 9/02077* (2013.01); *G01B 9/02004* (2013.01); *G01B 9/02091* (2013.01); *G06T 11/005* (2013.01)

(58) Field of Classification Search
CPC ............ G01B 9/02077; G01B 9/02004; G01B 9/02091; G06T 11/005
See application file for complete search history.

(56) References Cited

U.S. PATENT DOCUMENTS

2006/0164653 A1 7/2006 Everett et al.
2006/0244973 A1 11/2006 Yun et al.
(Continued)

OTHER PUBLICATIONS

Clara Pfaffle et al. "Reduction of frame rate in full-field swept-source optical coherence tomography by numerical motion correction [Invited]" Biomedical Optics Express, United States, vol. 8, No. 3, Mar. 1, 2017 (Mar. 1, 2017), p. 1499 DOI: 10.1364/BOE.8.001499 ISSN: 2156-7085, XP055655507 (Year: 2017).*
(Continued)

*Primary Examiner* — Uzma Alam
*Assistant Examiner* — Jonathon Cook
(74) *Attorney, Agent, or Firm* — DeWitt LLP

(57) ABSTRACT

A method for compensating the artifacts generated by moving measurement objects in measurement signals of swept-source OCT systems by moving measurement objects. Signal reconstruction is implemented without the aid of additional reference signals in respect of the movement of the measurement object and only by way of especially adapted algorithms. Example methods relate firstly to the especially adapted, Fourier transform-based algorithms for processing the captured measurement signals and secondly to the measurement signals to be captured, in particular to the optical coherence interferometry-based measurement systems used for the production thereof. Although the proposed method is provided for applications in ophthalmology in particular, it can be used, in principle, wherever signals reflected by curved surfaces or backscattered from structures are analyzed.

30 Claims, 8 Drawing Sheets

(51) Int. Cl.
*G01B 9/02091* (2022.01)
*G06T 11/00* (2006.01)

(56) References Cited

U.S. PATENT DOCUMENTS

2017/0105618 A1 4/2017 Hillmann et al.
2021/0090306 A1* 3/2021 Akcakaya .......... G01R 33/5611

OTHER PUBLICATIONS

Boy Braaf, Koenraad A. Vermeer, Victor Arni D.P. Sicam, Elsbeth van Zeeburg, Jan C. van Meurs, and Johannes F. de Boer, " Phase-stabilized optical frequency domain imaging at 1-μm for the measurement of blood flow in the human choroid," Opt. Express 19, 20886-20903 (Year: 2011).*
International Search Report for PCT/EP2019/076592, mailed Apr. 15, 2020, 6 pages.
English translation of ISR for PCT/EP2019/076592, mailed Apr. 15, 2020, 3 pages.
Written Opinion of the ISA for PCT/EP2019/076592, mailed Apr. 15, 2020, 11 pages.
English translation of Written Opinion of the ISA for PCT/EP2019/076592, mailed Apr. 15, 2020, 10 pages.
IPRP for PCT/EP2019/076592,issued Mar. 23, 2021, 12 pages.
Search Report for DE 10 2018 007 757.9,dated 05.08.2019, 8 pages.
Clara Pfäffle et al. "Reduction of frame rate in full-field swept-source optical coherence tomography by numerical motion correction [Invited]" *Biomedical Optics Express*, United States, vol. 8, No. 3, Mar. 1, 2017 (Mar. 1, 2017), p. 1499 DOI: 10.1364/BOE.8.001499 ISSN: 2156-7085, XP055655507.
Dierck Hillmann et al. "Common approach for compensation of axial motion artifacts in swept-source OCT and dispersion in Fourier-domain OCT" *Optics Express*, vol. 20, No. 6, Mar. 8, 2012 (Mar. 8, 2012), pp. 6776-6776 DOI: 10.1364/OE.20.006761 XP055219841.
Niederleithner, M.; "Feasibility of a thermally tuned laser diode as a light source for eye biometry"; Master's thesis, TU Vienna, Jul. 2018, 65 pages.

* cited by examiner

METHOD FOR COMPENSATING THE ARTIFACTS GENERATED BY MOVING MEASUREMENT OBJECTS IN MEASUREMENT SIGNALS OF SWEPT-SOURCE OCT SYSTEMS

RELATED APPLICATIONS

This application is a National Phase entry of PCT Application No. PCT/EP2019/076592 filed Oct. 1, 2019, which application claims the benefit of priority to DE Application No. 10 2018 007 757.9 filed, Oct. 2, 2018, the entire disclosures of which are incorporated herein by reference.

TECHNICAL FIELD

The present invention relates to a method that can be used to numerically compensate artifacts generated in measurement signals from OCT systems by moving measurement objects and to produce measurement signals without artifacts.

BACKGROUND

In the last two decades, optical biometry has become established worldwide and is the preferred measurement process in industrial countries for determining the biometric data before cataract operations, in particular. The measuring technique utilized to this end requires a high sensitivity.

According to the known prior art, lasers with a changeable or tunable wavelength lend themselves as a light source to this measuring technique since they can achieve the required high sensitivities. However, currently commercially available lasers with a changeable wavelength are very expensive, making the measuring technique extremely costly and preventing a wide application.

To facilitate the use even in newly industrialized countries, where many patients have very pronounced cataracts, it is necessary for the costs of this measuring technique to be reduced substantially, albeit without changing the sensitivity.

By way of example, simple VCSEL lasers or DFB lasers lend themselves as an alternative light source, as these are substantially more cost-effective and are able to be tuned thermally and/or electrically over a wavelength range of several nanometers.

However, a disadvantage of such lasers is that they can only realize a sweep duration in a region greater than 1 ms, but this is too slow for measurements in the living eye. This results in movement artifacts, which have to be compensated in order to ensure a high sensitivity and sufficient reproducibility, in the case of measurements on the living eye.

US 2017/105618 A describes an improved imaging system based on an interferometric frequency, domain or Fourier domain OCT (FD-OCT). There are two usual approaches for FD-OCT. One is the spectral domain OCT (SD-OCT), in which the interfering light is spectrally decomposed prior to detection and the complete depth information can be obtained from a single exposure. The second is swept source OCT (SS-OCT), in which the source is tuned over a range of optical frequencies and detected in time, as a result of which the spectral information is encoded in time. Although both techniques have already found use in ophthalmology, they also have a number of weaknesses. A number of systems that represent improvements for interferometric imaging techniques are described below. In addition to improvements within the scope of scanning, the reconstruction and representation of the signals, the illumination, or the optimization of reference signals, movement correction is also considered. If movement artifacts cannot be avoided, they can be corrected computationally. Thus, local movements corrections can be applied either in the spatial domain or in the frequency domain. In the frequency domain, they can be applied in the form of frequency-dependent movement corrections.

LITERATURE

[1] Niederleithner, M.; "Feasibility of a thermally tuned laser diode as a light source for eye biometry"; Master's thesis, TU Vienna, July 2018

SUMMARY OF THE INVENTION

Embodiments of the present invention address the problem of developing a solution that allows compensation of the artifacts generated in measurement signals of OCT systems by moving measurement objects, wherein additional technical means should be dispensed with to the greatest possible extent. In particular, the solution should allow the production of cost-effective biometric measurement systems, which ensure a high sensitivity and a sufficient reproducibility.

An example method for compensating the artifacts generated in measurement signals of swept source OCT systems by moving measurement objects achieves this object by virtue of the signal reconstruction being implemented without the aid of additional reference signals in respect of the movement of the measurement object and only by way of especially adapted algorithms.

Example developments and configurations, relate firstly to the especially adapted, Fourier transform-based algorithms for processing the captured measurement signals. Secondly, the example developments and configurations relate to the measurement signals to be captured, in particular to the optical coherence interferometry-based measurement systems used for the production thereof.

Although the example method is provided for applications in ophthalmology in particular, particularly for capturing the biometric data of an eye, it can be used, in principle, wherever signals reflected by curved surfaces or backscattered from structures are analyzed.

BRIEF DESCRIPTION OF THE DRAWINGS

The invention is described in more detail below on the basis of exemplary embodiments. In this respect.

DETAILED DESCRIPTION

Figure 1A:
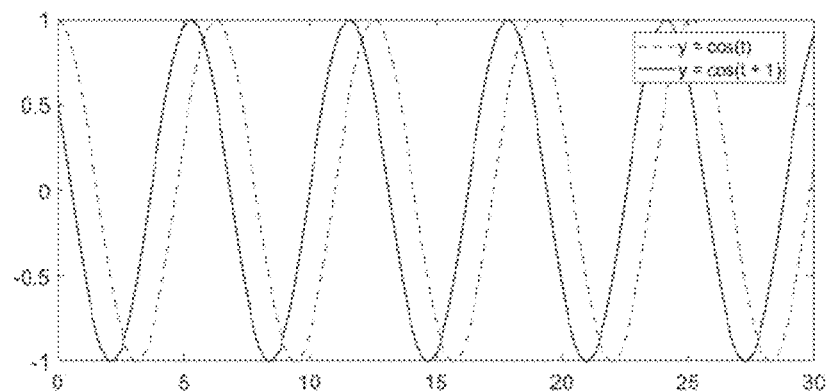
FIG. 1a: depicts the curves of the amplitude of two-phase-shifted signals over time.

Definitions:
  Sweep: Tuning a wavelength over a wavelength range
  Sweep range: Wavelength range over which a wavelength is tuned
  Chirped signal: Signal with a frequency spectrum
  Linear chirp: Signal with a linear frequency spectrum
  Relinearization: Interferometric signal with non-constant distances between the maxima (nonlinear phase response) is brought to a linear phase response with the aid of the remapping.
  Remapping: In theory, the spectral interference signal in Fourier domain OCT is a linear function of the wave number. However, in practice it deviates from linearity and this is corrected by the remapping. (=Relinearization). In very general terms, it is a method for mapping the components of a signal to a new one by way of a defined function.

In an example method for compensating the artifacts generated in measurement signals of swept source OCT systems by moving measurement objects, the signal reconstruction is implemented without the aid of additional reference signals in respect of the movement of the measurement object and only by way of especially adapted algorithms. Axial, lateral, and further movement artifacts are compensated.

The cross-correlation term in low coherence interferometry (LCI) is as follows:

$$I_D(k) = \frac{\rho}{2} S(k) \sum_{n=1}^{N} \sqrt{r_r r_{s_n}} \cos(2k(z_r - z_{s_n})) \quad (1)$$

For a single reflecting surface, the equation reduces to:

$$I_D(k) \propto \cos(2k(z_r - z_s)) = \cos(2k\Delta z) \quad (2)$$

where the Fourier pair are k and z in this case.

In swept source LCI, a sweep is carried out over the time t. The position of the measurement object can change during this time. To describe this behavior, the process must be described over time (t). This means that the wavenumber $k(t)$ and the distance $\Delta z(t)$ become functions of t:

$$I_D(k) \propto \cos(2k(t)\Delta z(t)) \quad (3)$$

On account of the change in the parameter of the function, the Fourier pair must also be changed from z and k to $\omega$ and t. If this is a linearly tuning source, $k(t)$ is a linear function:

$$k(t) = k_1 t + k_0 \quad (4)$$

$$k = \frac{k_e - k_0}{T} \quad (5)$$

where $k_1$ is the slope of a sweep, $k_e$ is the mean wavenumber and T is the sweep time.

For a stationary measurement object, $\Delta z(t)=z$ is a constant function and, by inserting the equation (5) into equation (3), leads to:

$$I_D(k) \propto \cos(2(k_1 t + k_0)z) = \cos(\underbrace{2k_1 z t}_{\omega} + \underbrace{2k_0 z}_{\Phi}) \quad (6)$$

Figure 1B:
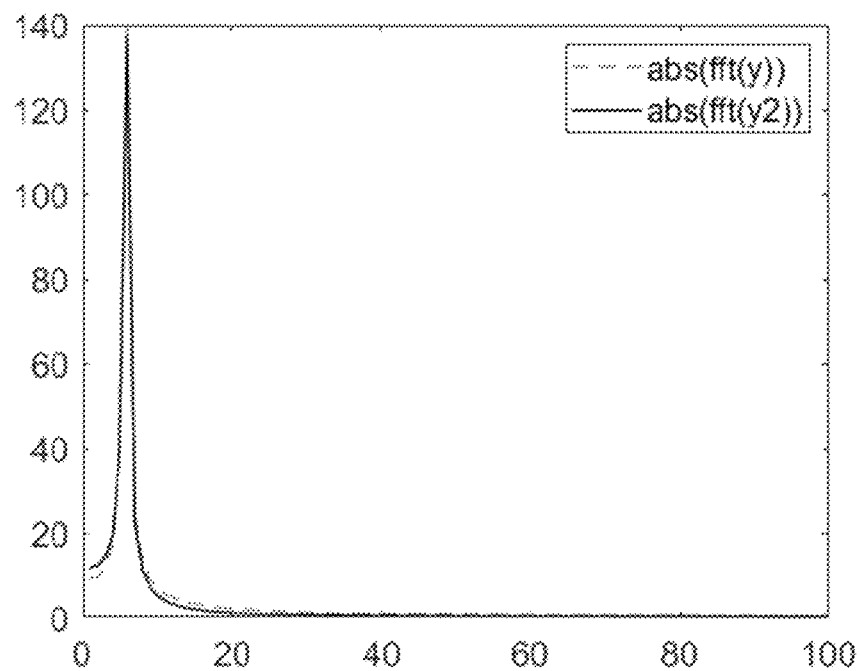
FIG. 1b: depicts the absolute value of the Fourier transform of the two phase-shifted signals.

The phase shift $\phi$ does not change the frequency $\omega$ of the signal. The Fourier transform t z leads to single frequency, which is illustrated in FIG. 1. This is the expected behavior for a reflecting, stationary measurement object.

FIG. 1 shows in graph a) the curves of the amplitudes of the phase-shifted signals y=cos (t) (blue) and y=cos (t+1) (red) over time. Graph b) shows the absolute value of the Fourier transform of the two signals. It is evident that both signals lead to the same Fourier transform.

Now, if the measurement object moves during a sweep, the position thereof is no longer constant but also changes as a function of time t.

The simplest case is a linear movement in the axial direction, where $z(t)$ becomes:

$$\Delta z(t) = vt + z_0 \quad (7)$$

where v is the speed and $z_0$ is the initial position. Inserting (7) and (4) into (3) again leads to:

$$I_D(k) \propto \cos(2[k_1 v t^2 + (k_1 z_0 + k_0 v) t + k_0 z_0]) = \quad (8)$$
$$\cos(2[\underbrace{(k_1 v t + k_1 z_0)}_{\omega(t)} + \underbrace{k_0 v) t + k_0 z_0)}_{\Phi}]$$

The parameter of the cosine term now consists of a quadratic part (left) and $\omega$ can be written as a linear function $\omega(t)$ (right). The phase is subject to (linear) acceleration and the Fourier transform no longer leads to a single frequency but to a spectrum of frequencies. Since $\omega(t)$ is a linear function, this is referred to as a linear chirp, which is illustrated in FIG. 2.

Figure 2A:
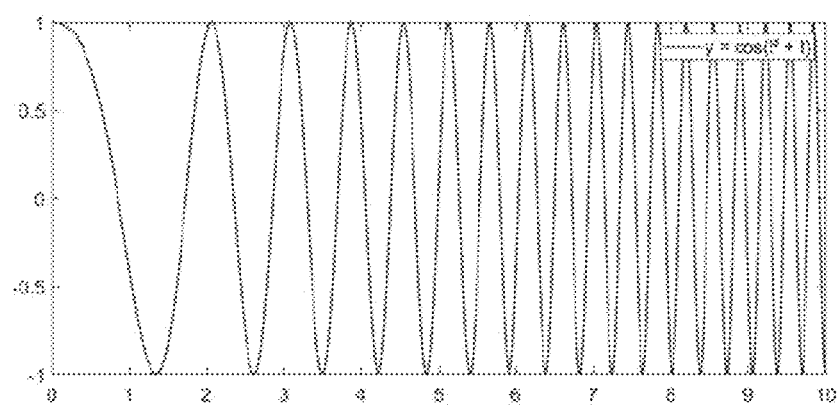
FIG. 2a: depicts the signal curve and the phase for the function y=cos(t2+t)
Figure 2B:
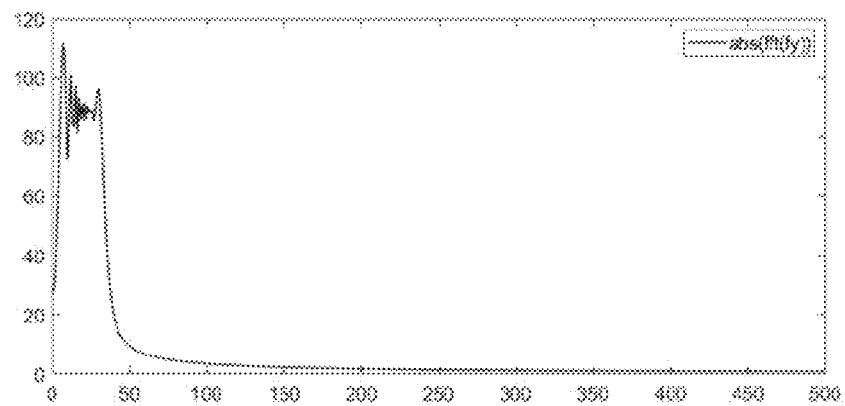
FIG. 2b: depicts the Fourier transform of y as a so-called linear chirp.

FIG. 2a shows the signal curve and the phase for the function y=cos (t²+t). FIG. 2b depicts the Fourier transform of y, as a so-called linear chirp.

The start frequency is given by $\omega(0)=k_1 z_0 + k_0 v$. The end frequency depends on the sweep time T and is given by: $\omega(T)=k_1 v T + k_1 z_0 + k_0 v$.

One process for reconstructing a chirped signal is the renewed linearization with remapping.

A real signal can be transformed into its analytic form by way of a Hilbert transform. This is a complex signal, the absolute value of which represents the same signal as the original real signal. The advantage of the complex form is that the phase can be derived easily, by way of:

$$\Phi = a\tan\left(\frac{\text{Im}}{\text{Re}}\right).$$

The extracted phase can be used as remapping function which, when applied to a signal nonlinear in k, relinearizes the latter. This algorithm can be used if the measured sample consists of a single reflecting surface. A "phase unwrapping" can be applied on account of the periodicity.

In accordance with a first example configuration, the method according to the invention for a single reflection is characterized in that:
  a) a chirped signal with an accelerating phase is captured,
  b) the phase of this signal is extracted by carrying out the Hilbert transform,
  c) the extracted phase is used to relinearize the signal, and d) a reconstructed, non-chirped signal arises by application of the relinearization by remapping.

Figure 3:
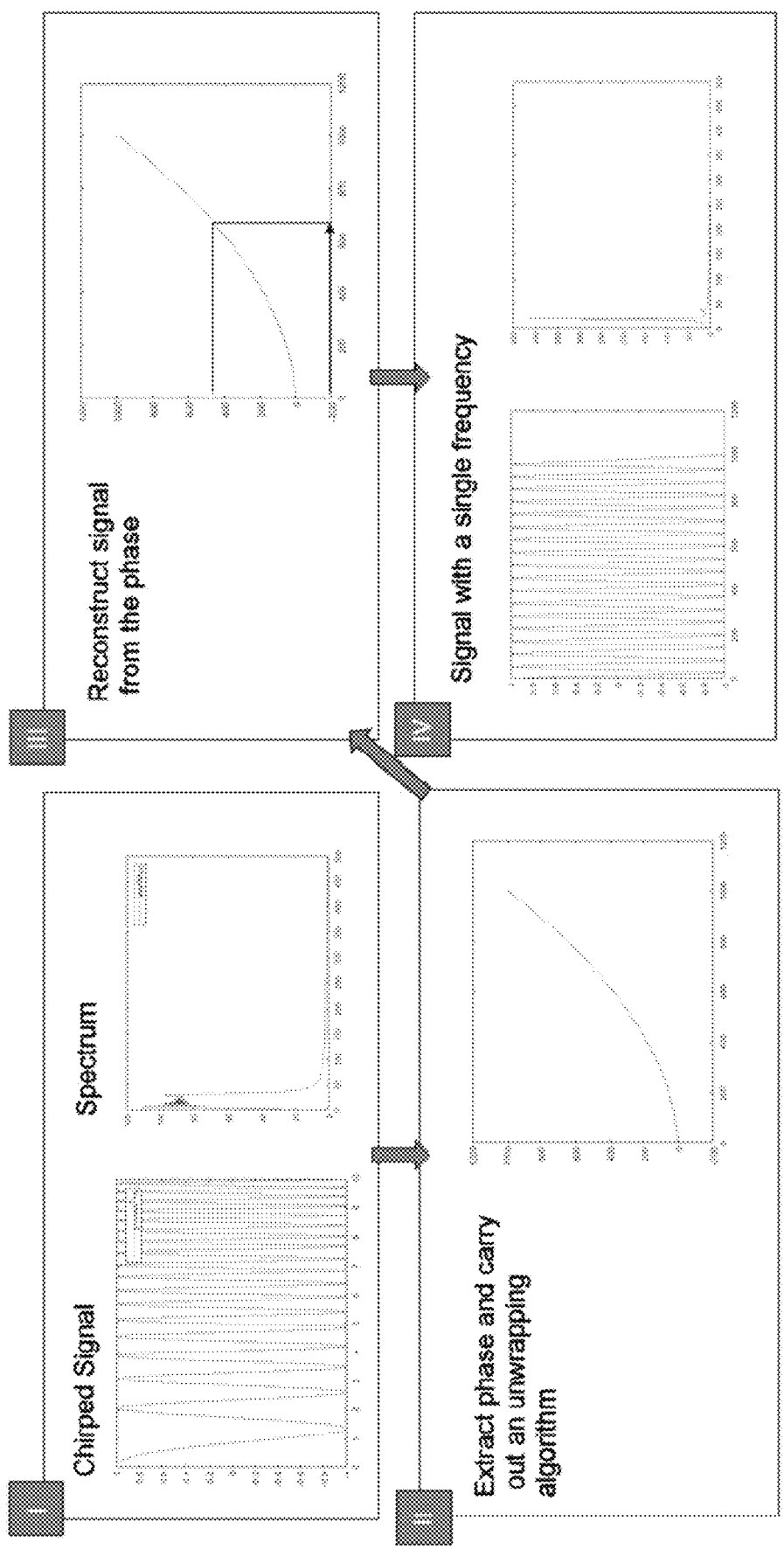
FIG. 3: depicts the algorithm for relinearizing a signal for only one reflection.

To this end, FIG. 3 shows the algorithm for relinearizing a signal for only one reflecting surface.

I: A chirped signal with an accelerated phase is captured.

II: The phase of this signal can be extracted by carrying out the Hilbert transform. It transforms the real signal into its analytic form. This is a complex signal, the absolute value of which corresponds to the real value. Then, the phase can be extracted from the angle between the imaginary and complex part. A "phase unwrapping" can also be applied on account of the periodicity.

III: The phase can be used as remapping function for the signal. The value of the phase can be used as an index.

IV: A non-chirped signal is obtained with the relinearization.

If the captured signal does not consist of only a single frequency on account of a plurality of reflecting surfaces, this algorithm cannot be applied without additional steps.

Knowledge of at least one discrete peak is required to be able to continue to apply this process. Then, the region which the chirp contains for this peak can be cut out and the phase can be extracted. The relinearization of this peak can also be applied to the entire signal, under the assumption that the entire sample has moved at the same speed.

To use this algorithm, the measured sample must consist of at least one discrete reflection, the chirp of which can be distinguished from another reflection.

If this chirp has already been superposed by other structures, it cannot be extracted.

In accordance with a second example configuration, the method according to the invention for a plurality of reflections is characterized in that:

a) a signal consisting of two or more reflections with the same speed is captured, b) if the first reflection arises from a single surface, it is cut from the remainder of the signal for this signal, subject to Fourier transform, the signal being inverse transformed again and its phase being extracted, c) the extracted phase is used to relinearize the entire original signal, and d) a reconstructed, non-chirped signal arises by application of the relinearization by remapping.

Figure 4:
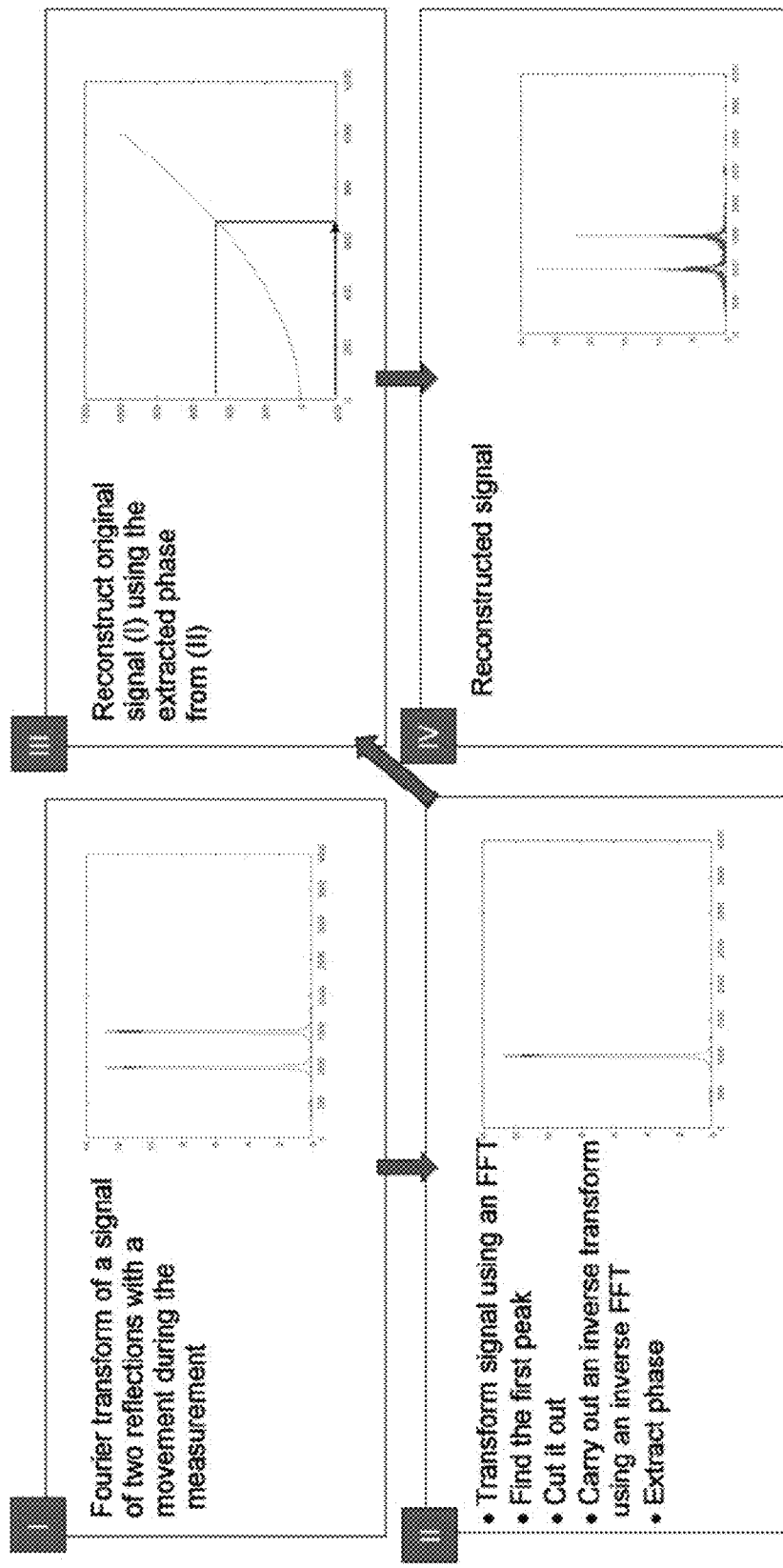
FIG. 4: depicts the algorithm for relinearizing a signal with multiple reflections.

To this end, FIG. 4 depicts the algorithm for relinearizing a signal with multiple reflections.

I: The signal consists of two (usually several) reflections, all of which are at the same speed.

II: Knowledge about the structure is required for a further reconstruction. By way of example, if the first reflection is a single surface, it can be used for the relinearization. To this end, the signal can be Fourier transformed and the first chirp can be cut out of the remainder of the signal. Then, the signal must be inverse transformed again. This signal will be complex, and so the phase can be extracted directly.

III: Using this phase, it is possible to linearize the entire original signal.

IV: A reconstructed structure is obtained.

In accordance with a third configuration, the compensation is implemented, according to the invention, by application of a "fractional Fourier transform" (FRFT).

The use of a "fractional Fourier transform" (FRFT) represents a further process for reconstructing a chirped signal.

The "fractional Fourier transform" (FRFT), as a generalization of the conventional Fourier transform, is the convolution of a standard Fourier transform and a rotation in the frequency/time domain through the angle α:

$$X_\alpha(u) = \int_{-\infty}^{\infty} x(t) K_\alpha(t,u) dt \quad (9)$$

where x (t) is the original function and $K_\alpha$ (t; u) represents the rotation. The transformation is implemented as t u. The rotation can be written as:

$$K_\alpha(t,u) = \begin{cases} \delta(t-u) & \alpha \text{ is a multiple of } 2\pi \\ \delta(t+u) & \alpha + \pi \text{ is a multiple of } 2\pi \\ \sqrt{\frac{1-j\cot(\alpha)}{2\pi}} e^{j\frac{u^2+c^2}{2}\cot(\alpha) - i\,ut\,\csc(\alpha)} & \text{otherwise} \end{cases} \quad (10)$$

Consequently, the FRFT becomes the unit operator for α as a multiple of $2\pi$ and the function is mirrored for α+π as a multiple of $2\pi$.

For $$\alpha = \frac{\pi}{2}: \cot\left(\frac{\pi}{2}\right) = 0 \text{ and } \csc\left(\frac{\pi}{2}\right) = 1$$

the exponential function in (10) is reduced to $e^{jut}$, and inserted into (9) for the definition of the Fourier transform:

$$X_{\frac{\pi}{2}}(u) = \int_{-\infty}^{\infty} x(t) e^{jut} dt \quad (11)$$

For arbitrary angles, equation (10) adds a quadratic component to the transform. As described above in equation (8), a quadratic component leads to a linear chirp.

Figure 5:
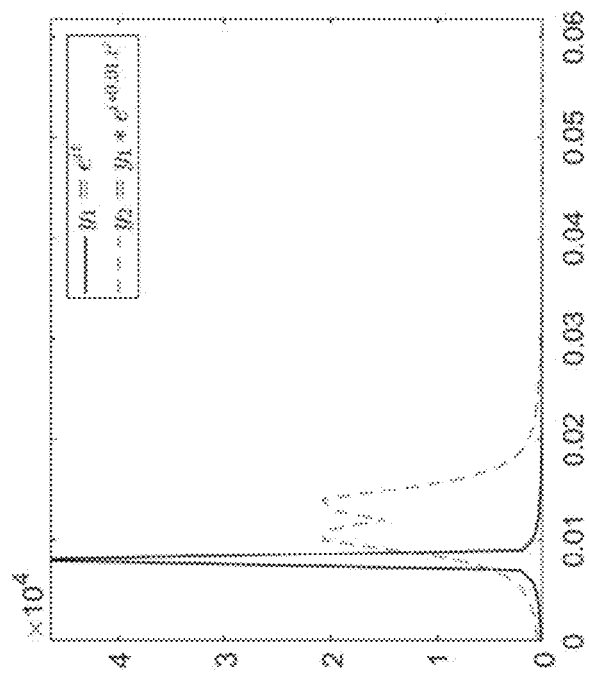
FIG. 5: depicts the algorithm for adding a quadratic part to the transformation in order to generate a linear chirp.
Figure 5:
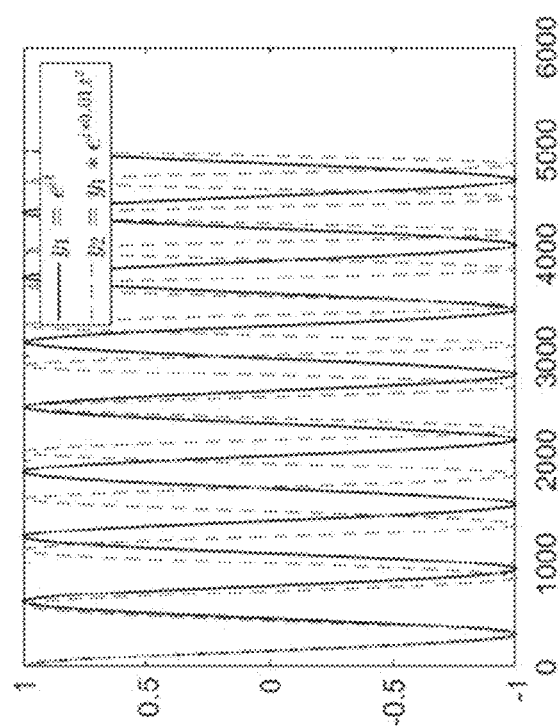

This algorithm for converting the transform into a linear chirp is illustrated in FIG. 5. A quadratic part is added to a signal with a single frequency (left graph). The right graph shows the spectra of the two functions resulting therefrom.

Therefore, the FRFT of a signal with a single frequency leads to a chirp in the frequency domain. On the other hand, a chirped signal can be transformed back to a single peak.

Some basic properties of FRFT:

$X_0 = I$, is the identity operator, $X_{\pi/2} = F$, is the usual Fourier transform, $X_\pi = P$, is the parity operator, $X_{3\pi/2} = FP = PF$, is the mirrored Fourier transform $X_{2\pi} = X_0 = I$ $X_{2\pi n \square} + \square\alpha = X_{2\pi n' \square} + \square\alpha I$, for arbitrary integers n and n', and $Xa_\square + Xa_\square = Xa_\square + \alpha_\square$, index additivity.

A further important property of FRFT is that it satisfies Parseval's theorem:

$$\int_{-\infty}^{\infty} f(t) g^*(t) dt = \int_{-\infty}^{\infty} F_\alpha(u) G_\alpha^*(u) du \quad (12)$$

where $F_\alpha(u)$ and $G_\alpha^*(u)$ are the fractional Fourier transforms off (t) and g*(t), respectively. If f(t)=g (t), equation (12) becomes:

$$\int_{-\infty}^{\infty} |f(t)|^2 dt = \int_{-\infty}^{\infty} |F_\alpha(u)|^2 du \quad (13).$$

It shows that the integral (the sum in the discrete case) of the square of a function equals the integral of the square of its transformation, even under different angles (a).

A linear movement can be described by a constant speed:

$$z(t) = vt + z_0.$$

As already described in equation (8), this leads to an intensity proportional to:

$$\exp(2[k_1 vt^2+(k_1 z_0+k_0 v)t+k_0 z_0]).$$

Together with the rotation of the FRFT, the integrand becomes: (14).

$$\exp(2i(k_1 vt^2 + (k_1 z_0 + k_0 v)t) * \exp\left(-i\frac{t^2}{2}\pi\cot(\alpha) - i\pi\cosec(\alpha)\right) =$$

$$\exp\left(i\left[2k_1 v - \frac{1}{2}\pi\cot(\alpha)t^2 + \left(2k_1 z_0 + 2k_0 v - \frac{1}{2}\pi u\cosec(\alpha)\right)t\right]\right)$$

It is evident that for:

$$a = \text{arccot}\left(\frac{2}{\pi}k_1 v\right)$$

the quadratic part becomes zero and the signal can be described by a single frequency.

The fractional Fourier transform is able to dechirp a linear chirp at a certain angle. In the case of the eye length measurement, the speed which determines the extent of chirping is unknown. A minimization algorithm can be applied in order to obtain this information. Since there is a degree of freedom (α☐☐, it is necessary to determine a variable for the minimization.

Since the FRFT satisfies Parseval's theorem, one option consists in measuring the height of a peak (absolute value; intensity) in the frequency domain. As already shown in FIG. 5, chirping leads to a reduced maximum. Therefore, the signal with the highest maximum is the least chirped signal. The algorithm calculates the FRFT of the measured signal for a certain number of angles and checks the maximum of the signal. The signal with the highest maximum must be the least chirped signal.

The search interval of the maximum should be chosen carefully and set to locations at which the signals for the cornea and/or the retina are expected.

In detail, the compensation according to the invention for a single reflection by means of fractional Fourier transform (FRFT) is implemented by virtue of
a) the free parameter (angle) of the FRFT being altered iteratively, until a quality function reaches its maximum value,
b) the FRFT of the measured signal being calculated for a certain number of angles,
c) the parameter with the maximum signal value according to FRFT being determined,
d) said FRFT being used for the relinearization of the entire original signal, and
e) reconstructed, non-chirped signals arising by means of the relinearization by remapping.

In this case, it is advantageous for example if the quality function of the signal components summed over the measurement depth lies above a defined threshold.

It is furthermore advantageous for example to restrict the free parameter to expected axial speeds.

In particular nonlinear chirps can also be corrected by a signal correlation with defined chirped reference signals, wherein the reference signal yielding the maximum correlation is used for the linearization of the signal phase.

According to example embodiments of the invention, the linearization and the reconstruction of the signal can be performed using machine or deep learning algorithms.

Figure 6:
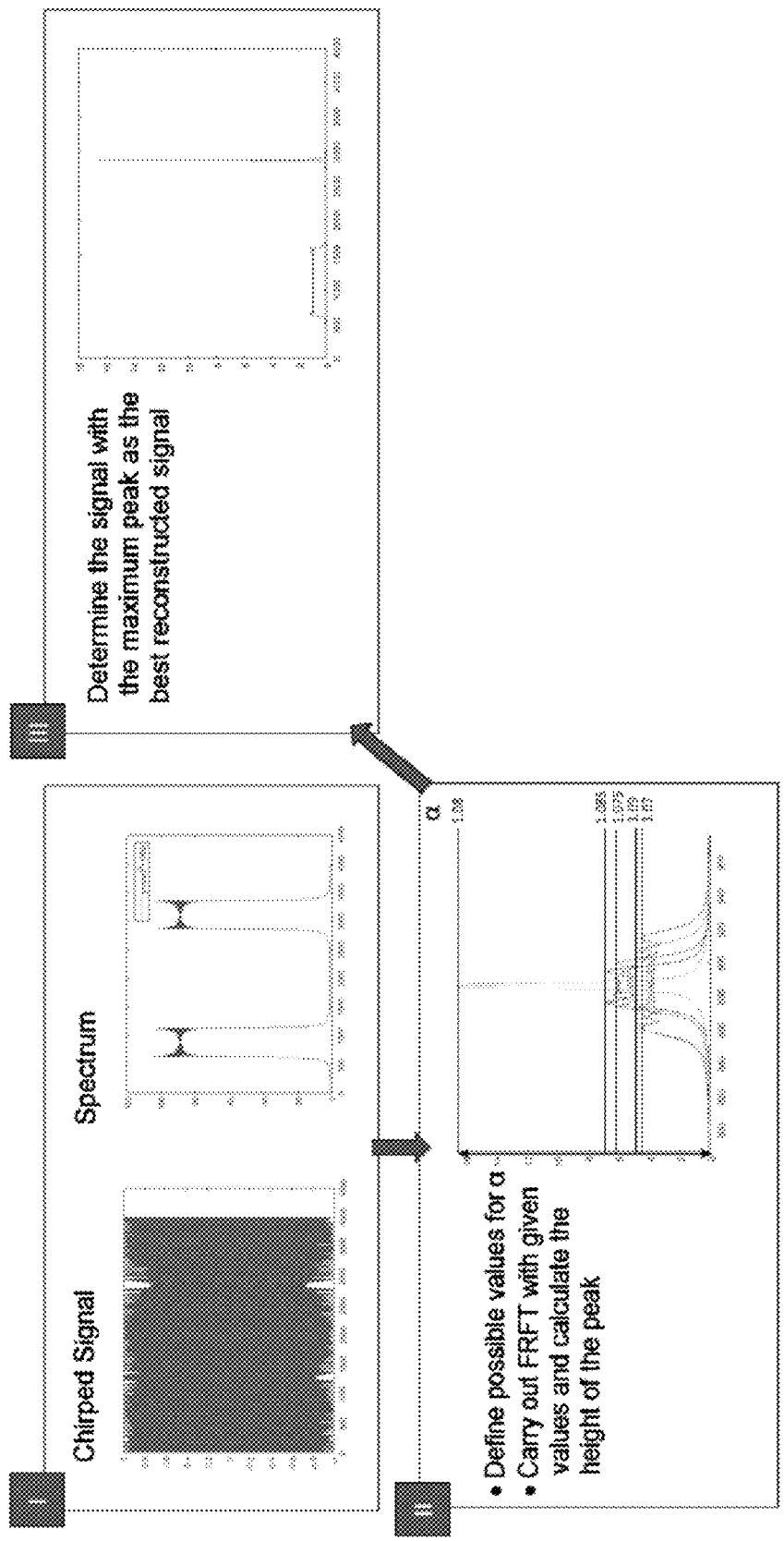
FIG. 6: depicts the algorithm for relinearizing a signal with only a single reflection.

To this end, FIG. 6 depicts the algorithm for relinearizing a signal with a single reflection.
I: A chirped signal with an accelerated phase is captured.
II: FRFTs with a certain angle range are carried out and the height of the peak is measured.
III: The angle leading to the highest value is determined as the least chirped and hence best reconstructed signal.

Further advantageous example configurations of the method according to the invention are described below, which configurations relate to the captured measurement signals, in particular to the optical coherence interferometry-based measurement systems used to this end.

For example, the measurement signals originate from slowly tuned swept source systems, which have tuning frequencies <2 kHz, in particular <100 Hz.

In particular, the measurement signals originate from OCT systems, which have coherence lengths of the tunable laser of for example 10 mm to 1000 m, in a particular example 20 to 100 mm.

The tunable laser of the utilized OCT system should have a sweep range between 1 and 100 nm, in particular 2 and 20 nm, and a central wavelength between for example 700 and 1400 nm, in particular examples a central wavelength around 780, 830, 1050 or 1300 nm.

A particularly advantageous example configuration of the method according to the invention should be considered that of being able to ascertain the eye length from temporal M-scans, for the purposes of which a two-dimensional signal representation, with depth coordinate and time coordinate, is necessary.

The depth scans showing the local reflectivity levels along the depth axis are strung together for such a two-dimensional representation. Then, a peak, e.g., from the corneal interior surface, is identifiable in the 2D image as a line, with the brightness of the line being proportional to the OCT signal. The second relevant peak is the signal from the retina. Depth position changes may arise here, for example if the measurement is carried out in the vicinity of the fovea centralis or if the nerve fiber layer dominates the signal from the retina instead of the pigment epithelium. Such changes can be captured very easily in a 2-dimensional representation, or it is also possible to determine from where the dominant signal of the retina actually originates. This 2-D representation can also be referred to as self-scanning OCT, with the movement of the measurement beam on the retina arising from the usually involuntary movements by the measured subject themselves.

Furthermore, axial positions of structure signals can also be intuitively interpolated or extrapolated in a 2-D representation should these be attenuated or lost in one or more depth scans as a result of poor detection of the backscattered light or speckle effects. If enough depth scans are recorded, these contain a sufficient number of reference signals for interpolation and extrapolation. Furthermore, it is possible to graphically ascertain a mean distance between different structure signals, for example by regression.

With respect to the source, the configurations set forth below are proposed for optimizing the method.

By way of example, the source can only drive to randomized spectral points (the number of sampling points is lower here than the number corresponding to the Nyquist sampling theorem), with the signal reconstruction then being implemented iteratively by use of a plurality of recorded interference signals. The advantage is in this case the fast recording by use of fewer points and the avoidance or reduction of movement artifacts. Then, the reconstruction can be implemented, for example by use of known methods such as the Allebach algorithm*. (See, e.g., K. D. Sauer, Allebach, IEEE Trans. CAS-34/12 (1987)).

The aforementioned approach also works with defined (non-randomized) sets of spectral points. Or, only parts of the spectrum are tuned by the source, with the signal reconstruction then being implemented within the scope of post-processing. As a rule, the spectral parts lead to axial scans with a low axial resolution. Combining a plurality of scans with different portions then allows the original axial resolution to be re-established. Like above, recording the spectral portion helps shorten the measurement time and avoid movement artifacts.

Below, further example configurations of the proposed method in relation to the compensation of axial, lateral, and further movement artifacts are described.

For example, the movement correction can be calculated from temporal M-scans in the optical frequency range, for the purposes of which a two-dimensional signal representation with spectral coordinate and time coordinate is required.

However, it is also possible to calculate the lateral movement correction by way of a signal reconstruction by partial spectra.

According to example embodiments of the invention, a lateral movement correction can be implemented by synchronous recording and comparison of depth scans of two laterally offset beams.

According to further example embodiments of the invention, the general movement and signal correction can likewise be implemented by "machine learning" algorithms. To this end, actual data with movement artifacts and the correction thereof can be used for training machine learning algorithms. Alternatively, synthetic data that simulate typical movement artifacts are used for the purposes of training the machine learning algorithms.

Figure 7:
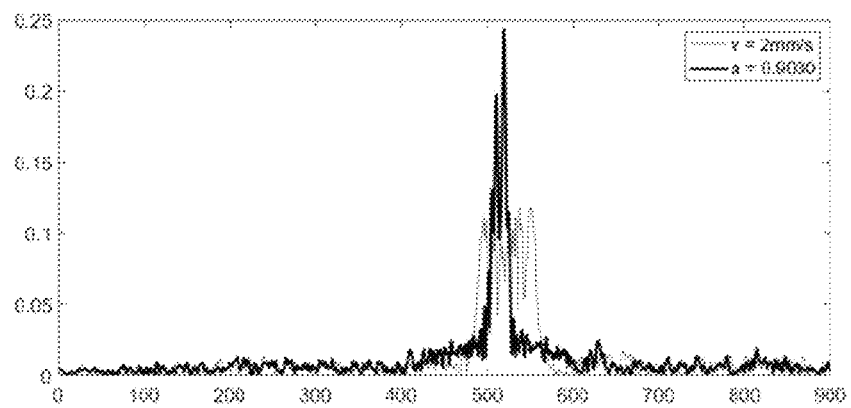
FIGS. 7-9: depicts Fourier transformed spectra before and after the reconstruction with FRFT for measurement objects moving at different speeds.
Figure 8:
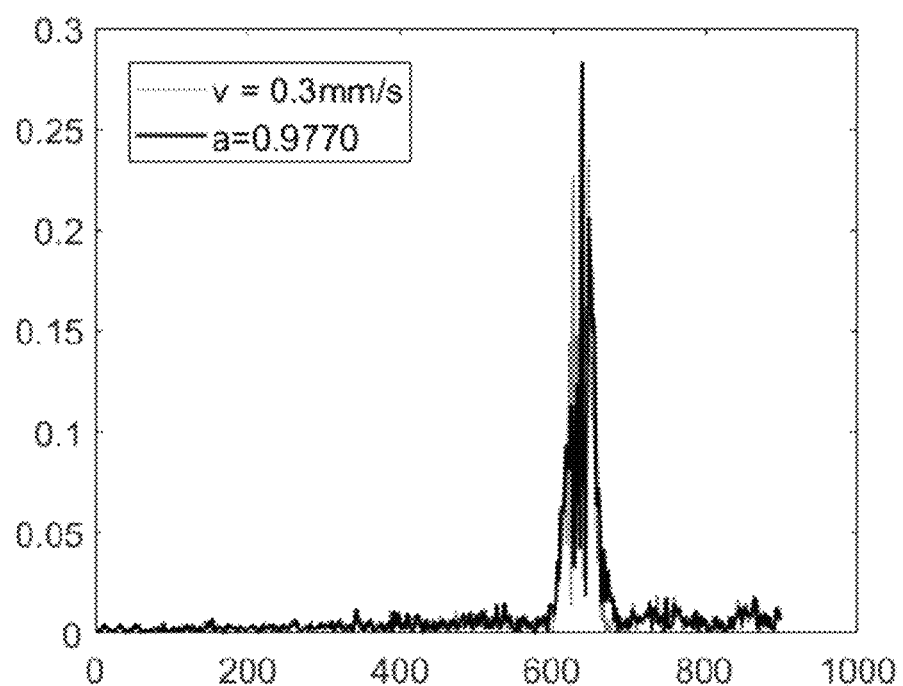
Figure 9:
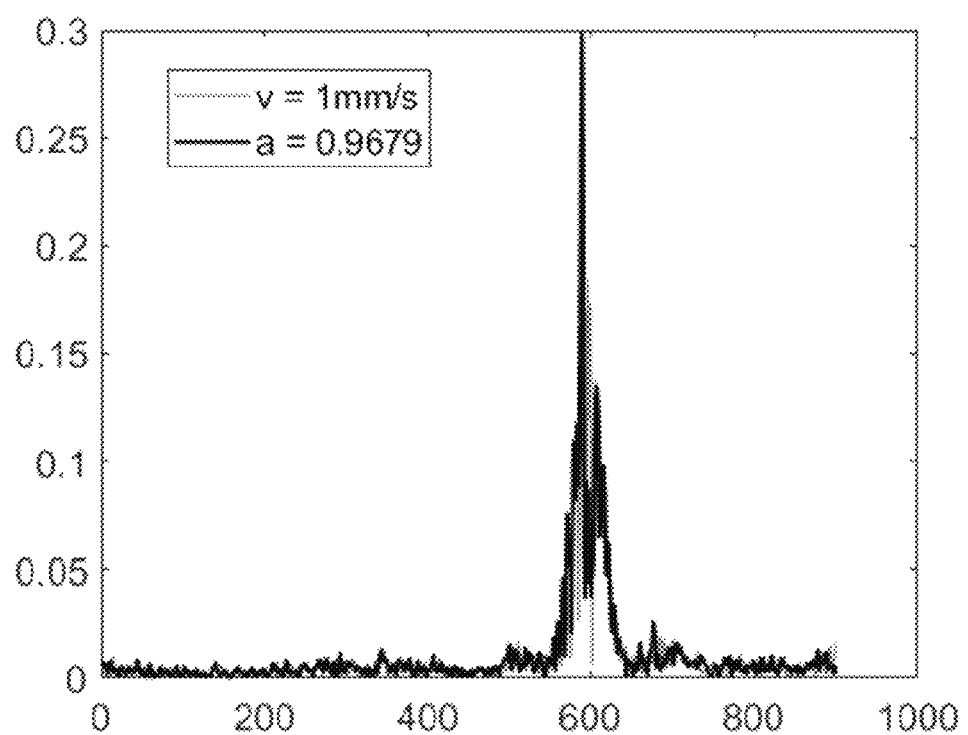

FIGS. 7, 8 and 9 show, in example fashion, a Fourier transformed spectrum prior to the reconstruction (blue) and the peak (orange) generated therefrom by reconstruction with FRFT, for measurements of a moving measurement object. The bandwidth before the reconstruction was approximately 50 nm at a sweep time of 0.05 s.

FIG. 7 shows the result for a measurement object moving at a speed of 2 mm/s, wherein the sweep time was 0.025 s.

FIG. 8 shows the result for a measurement object moving at a speed of 0.03 mm/s, wherein the sweep time was 0.05 s.

FIG. 9 shows the result for a measurement object moving at a speed of 1 mm/s, wherein the sweep time was 0.063 s. The value a arises from:

$$a = \frac{2}{\pi}\alpha.$$

Using the solution according to the invention, a method is provided that allows artifacts generated in measurement signals of OCT systems by moving measurement objects to be compensated. In particular, this is achieved without additional technical means, for example a movement or acceleration detector.

Here, the signal reconstruction is implemented without the aid of additional reference signals in respect of the movement of the measurement object and only by way of adapted algorithms.

In particular, the method according to the invention uses laser diodes which allow the construction of cost-effective biometric measurement systems, which ensure a high sensitivity and a sufficient reproducibility.

The proposed method works at sweep rates of <1 kHz.

Consequently, this allows optical biometry to become established not only in industrial countries but also in newly industrialized countries, where many patients have very pronounced cataracts.

The invention claimed is:

1. A method for compensating the artifacts generated in measurement signals of swept source OCT systems by moving measurement objects, the method comprising:
   implementing signal reconstruction without aid of additional reference signals in respect of movement of the measurement object and only by application of especially adapted algorithms; and
   for an individual reflection:
   a) capturing a chirped signal with an accelerated phase,
   b) extracting a phase of the chirped signal by carrying out the Hilbert transform,
   c) using the extracted phase to relinearize the signal, and
   d) wherein a reconstructed, non-chirped signal arises by application of the relinearization by remapping.

2. The method as claimed in claim 1, further comprising compensating axial movement artifacts.

3. The method as claimed in claim 2, further comprising implementing the compensation by application of a relinearization by remapping.

4. The method as claimed in claim 1, further comprising compensating axial, lateral, and further movement artifacts.

5. The method as claimed in claim 1, further comprising, for multiple reflections:
   a) capturing a signal consisting of two or more reflections including a first reflection with the same speed,
   b) if the first reflection arises from a single surface, cutting the first reflection from a remainder of the signal for this signal,
   subjecting the signal to Fourier transform, inverse transforming the signal again and extracting the signal's phase,
   c) using the extracted phase for the relinearization of the entire original signal, and
   d) wherein a reconstructed, non-chirped signal arises by application of the relinearization by remapping.

6. The method as claimed in claim 1, further comprising implementing the compensation by application of a fractional Fourier transform (FRFT).

7. The method as claimed in claim 6, further comprising, for two or more reflections with the same speed:
   a) iteratively altering a free parameter of the FRFT, until a quality function reaches a maximum value,
   b) calculating the FRFT of the measured signal for a certain number of angles,
   c) determining a parameter with the maximum signal value according to the FRFT,
   d) using said FRFT for the relinearization of the entire original signal, and
   e) wherein a reconstructed, non-chirped signal arises by application of the relinearization by remapping.

8. The method as claimed in claim 6, wherein a quality function of signal components summed over measurement depth lies above a defined threshold.

9. The method as claimed in claim 7, further comprising restricting the free parameter to expected axial speeds.

10. The method as claimed in claim 2, further comprising also correcting nonlinear chirps by a signal correlation with defined chirped reference signals, wherein the reference signal yielding the maximum correlation is used for the linearization of the signal phase.

11. The method as claimed in claim 2, further comprising performing the linearization and the reconstruction of the signal using machine or deep learning algorithms.

12. The method as claimed in claim 1, wherein the measurement signals originate from slowly tuned swept source systems, which have tuning frequencies <2 kHz.

13. The method as claimed in claim 12, wherein the measurement signals originate from slowly tuned swept source systems, which have tuning frequencies <100 Hz.

14. The method as claimed in claim 1, wherein the measurement signals originate from slowly tuned swept source systems, which have coherence lengths of the tunable laser of 10 mm to 1000 mm.

15. The method as claimed in claim 14, wherein the measurement signals originate from slowly tuned swept source systems, which have coherence lengths of the tunable laser of 20 to 100 mm.

16. The method as claimed in claim 1, wherein the measurement signals originate from OCT systems with a sweep range between 1 and 100 nm.

17. The method as claimed in claim 16, wherein the measurement signals originate from OCT systems with a sweep range between 2 and 20 nm.

18. The method as claimed in claim 1, wherein the measurement signals originate from OCT systems, the tunable laser of which has a central wavelength between 700 and 1400 nm.

19. The method as claimed in claim 1, wherein the measurement signals originate from OCT systems, the tunable laser of which has a central wavelength around 780, 830, 1050 or 1300 nm.

20. The method as claimed in claim 1, further comprising ascertaining the eye length from temporal M-scans, wherein there is a two-dimensional signal representation with depth coordinate and time coordinate.

21. The method as claimed in claim 20, further comprising stringing together the depth scans showing the local reflectivity levels along the depth axis for the two-dimensional signal representation.

22. The method as claimed in claim 20, further comprising, for the two-dimensional signal representation, interpolating or extrapolating axial positions of attenuated or missing structure signals intuitively.

23. The method as claimed in claim 22, further comprising using reference signals from other depth scans for the interpolation or extrapolation of structure signals.

24. The method as claimed in claim 20, further comprising, for a two-dimensional signal representation, ascertaining the mean distance between various structure signals graphically.

25. The method as claimed in claim 1, further comprising implementing the source drives to randomized or defined subsets of spectral points and implementing the signal reconstruction iteratively by use of a plurality of recorded interference signals.

26. The method as claimed in claim 1, wherein the source only tunes parts of the spectrum and further comprising implementing the signal reconstruction in post-processing.

27. The method as claimed in claim 4, further comprising calculating the movement correction from temporal M-scans in the optical frequency range, wherein there is a two-dimensional signal representation with spectral coordinate and time coordinate.

28. The method as claimed in claim 4, further comprising implementing the lateral movement correction by signal reconstruction over partial spectra.

29. The method as claimed in claim 4, further comprising implementing the lateral movement correction by synchronous recording and comparison of depth scans of two laterally offset beams.

30. The method as claimed in claim 4, further comprising implementing the general movement correction and signal correction by machine learning algorithms.

* * * * *